United States Patent Office 3,497,355
Patented Feb. 24, 1970

3,497,355
DIAZOTYPE REPRODUCTION MATERIAL COMPRISING A DIAZONIUM COMPOUND AND METHOD OF USE

Michael F. Mizianty, Binghamton, N.Y., assignor to GAF Corporation, New York, N.Y., a corporation of Delaware No Drawing. Filed Jan. 11, 1968, Ser. No. 697,022
Int. Cl. G03c *1/58, 5/22, 1/66*
U.S. Cl. 96—49 10 Claims

ABSTRACT OF THE DISCLOSURE

Light-sensitive diazonium compounds having improved thermal stability comprising diazotized derivatives of a paraphenylenediamine of the following structural formula:

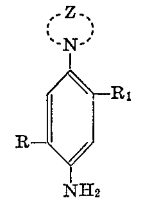

wherein R and $R_1$ represent hydrogen, halogen alkyl or alkoxy and Z represents the atoms necessary to complete a hydroxy-substituted piperidino ring.

The present invention relates, in general, to diazotype photoreproduction, and in particular to the provision of novel and improved light-sensitive diazonium compounds for such purposes.

The diazotype method of photoreproduction is, of course, a well-established branch of photographic technology having achieved a significant measure of commercial success. Basically, diazo sensitizing compositions are categorized according to their adaptability to either "wet" or "semi-dry" processing. Regardless of the particular system employed, image reproduction is obtained as a result of the photolytically induced decomposition of the diazo sensitizing component whereby such diazo components are rendered incapable of coupling to provide a dye image. Thus, in actual practice, a suitable base material is coated with a sensitizing composition containing the diazo sensitizer and thereafter exposed to actinic radiation, e.g., UV light, through a suitable pattern which may be a line drawing, photographic transparency, etc. The diazo compound present in those areas of the sensitized layer affected by the exposure radiation, i.e., unprotected by the image portions of the copy being reproduced, undergoes a decomposition reaction whereby its capacity to combine subsequently with the coupling component to form dyestuff is destroyed. In the semi-dry diazotype process wherein the coupling component or components are included as ingredients of the sensitizing composition, development is effected merely by subjecting the element thus exposed to an alkaline atmosphere, e.g., by bringing it into contact with ammonia vapors, with the concomitant formation of dyestuff in the non-exposed areas due to coupling of the residual diazo compound and color coupling components. A reproduction of the original pattern is obtained as an azo dye image on a light background. The aforedescribed procedure can be effectively carried out with the utilization of automatic printing and processing equipment specifically provided for such purposes, such apparatus being capable of performing successively the dual operations of exposure and dry development. Usually, apparatus of this type is provided with physically separate chambers through which the exposed print material is successively transported, via suitable mehanical means.

Diazotype photoreproduction of the thermal type has likewise assumed considerable importance as regards commercial methods of photoreproduction. According to processing of this type, initiation of the dye-forming coupling reaction, i.e., development, is effected by the reaction of heat alone. Diazo sensitizing compositions specifically adapted to heat-development usually contain one or more reagents having an acid to neutral reaction and which, on heating, dissociate to yield an alkaline-reacting compound. Thus, when thermal dissociation of such a substance proceeds to an extent sufficient to impart an overall alkaline pH to the diazo layer, the coupling reaction is initiated in the non-light-struck portions, i.e., those areas corresponding to the opaque areas of the negative or positive being reproduced.

As will be recognized, it is of critical importance, regardless of the particular process being employed, that the print obtained possess satisfactory contrast, density, dye brightness, etc. Thus, those areas of the light-sensitive material subjected to the actinic effects of the exposure radiation should be totally devoid of spurious discoloration; this is readily understandable since the light-sensitive diazonium compound should, ideally, yield colorless products upon light-induced decomposition.

However, many of the light-sensitive diazo compounds heretofore promulgated for use in processing of the aforedescribed types are undesirably characterized in failing to provide optimum contrast levels, the failures in this regard being traceable to the tendency of the diazonium compound to undergo decomposition due to side reactions, with the concomitant formation of colored products. In this connection, reference may be made to the tendency of many diazonium compounds to decompose upon inadvertent subjection to thermal effects. In other instances, it is found that a given diazo-coupler system exhibits an intolerable level of pre-coupling. Regardless of the particular mechanism responsible for such deleterious effects, the production of photocopy possessed of the requisite sensitometric quality proves highly problematical.

Although problems of the aforedescribed type are found to beset the processor in various types of diazotype processing, e.g., one-component, two-component, etc., the difficulties encountered prove to be specifically burdensome in connection with diazo processing of the thermal type.

As a result of the foregoing situation, considerable industrial activity has centered around the research and development of light-sensitive diazonium compounds which would avoid problems of this nature. Although many of the diazo compounds promulgated provide some margin of advantage, it is invariably found that improvement in a given property, e.g., thermal stability is accompanied by other undesirable effects, e.g., suppression in light-sensitivity, development speed, and the like.

Thus, the provision of light-sensitive diazonium compounds possessed of superior resistance to the formation of unwanted discoloration of print background without adversely affecting other essential properties continues to challenge diazotype technology.

Thus, a primary object of the present invention resides in the provision of light-sensitive diazonium compounds wherein the aforedescribed disadvantages are eliminated or at least mitigated to a substantial extent.

Another object of the present invention resides in the provision of diazo sensitizing compositions capable of providing image reproduction substantially devoid of background discoloration.

A further object of the present invention resides in the provision of diazo sensitizing compositions advantageously adapted for use in connection with wet processing techniques, semi-dry processing techniques as well as thermal processing techniques, and capable of providing image reproductions having superior contrast, density, etc.

Other objects of the present invention will become more apparent hereinafter as the description proceeds.

The attainment of the foregoing and related objects is made possible in accordance with the present invention which, in its broader aspects, includes the provision of light-sensitive diazonium compounds comprising diazotized derivatives of a paraphenylenediamine of the following structural formula:

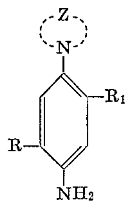

wherein R and $R_1$ independently represent hydrogen; halogen, e.g., chloro, bromo, etc.; alkyl and preferably lower alkyl containing from 1 to 4 carbon atoms, e.g., methyl, ethyl, propyl, isopropyl, etc.; alkoxy, e.g., methoxy, ethoxy, etc.; and Z represents the atoms necessary to complete a heterocyclic radical selected from the group consisting of hydroxypiperidino, e.g., 3-hydroxypiperidino, 4-hydroxypiperidino, etc.

One of the truly surprising aspects of the present invention resides in the discovery that the presence of the hydroxy substituent in the piperidino ring vitally overall affects the properties of the benzenediazonium compounds. Thus, it is found that compounds so substituted may be employed to significant advantage in all kinds of diazotype photoreproduction, with particularly beneficial results accruing from the use of such compounds in connection with thermal processing.

As specific examples of compounds falling within the ambit of the above-depicted structural formula there may be mentioned in particular and without necessary limitation the following:

4 - (4 - hydroxypiperidino)benzenediazonium chlorozincate;

4 - (3 - hydroxypiperidino)benzenediazonium chlorozincate;

2,5 - diethoxy - 4 - (4 - hydroxypiperidino)benzenediazonium chlorozincate; . . . etc.

When formulating two-component diazo sensitizing compositions, any of the coupling materials conventionally employed for such purposes may be utilized, the particular coupler selected depending upon the color aspect desired in the reproduction, e.g., red, blue, green, black, etc. As particular examples of suitable coupler materials there may be mentioned without necessary limitation the following:

Resorcinol
Phloroglucinol
Sodium, 6,7-dihydroxynaphthalene-2-sulfonate
2,3-dihydroxynaphthalene
2,3-dihydroxynaphthalene-6-sulfonic acid
2-hydroxynaphthalene-3,6-disulfonic acid
2,3-dihydroxynaphthalene-6-carboxylic acid
1-amino-7-hydroxynaphthalene
4-hydroxybenzimidazole hydrochloride
2-hydroxynaphthalene-8-biguanide
2,2',4,4'-tetrahydroxydiphenyl
4-hydroxyquinolone
1-methyl-4-hydroxyquinolone(2)
1-phenyl-3-methylpyrazolone
Acetoacetanilide
Acetoacet-o-toluidide
Acetoacetic acid benzylamide, . . . etc.

As previously mentioned, the light-sensitive diazonium compounds of the present invention are particularly beneficial in connection with thermal diazotype processing. In the formulation of heat-developable diazo sensitizing compositions, it is a recognized practice to include one or more heat-responsive reagents having an acid to neutral reaction at room temperature and which are adapted to yield, on heating to temperatures of 100° C. to 200° C., an alkaline reacting compound which serves to neutralize the acid ingredient of the composition. Suitable heat-responsive reagents found to be eminently useful in the practice of the present invention include, for example sodium trichloroacetate as well as its derivatives which are capable of yielding ammonium or nitrogen bases on heating, alkali metal salts of strong organic acid which are decomposed on heating to form basic compounds such as alkali metal salts of malonic, oxalic, maleic or benzene sulphinic acids; alkali metal salts of aliphatic monocarboxylic acids having 2, 3 or more carbon atoms containing negative substituents such as halogen, CN or $NO_2$ in the alpha and/or beta positions; and of these, especially the alkali metal (e.g., Na, K), ammonium and nitrogen base salts of trichloroacetic acid.

Accelerators or auxiliary sources of alkali such as dicyandiamide, guanidine sulfate and the like can be used advantageously with any of the aforesaid reagents.

Development of thermal diazo sensitizing compositions may be effected simply by heating the exposed diazo layer to temperatures ranging from about 100° C. to about 200° C. and preferably from about 110° C. to about 165° C.

The base to which the diazo coating solution is applied may be any of those conventionally employed for such purposes in the art. Thus, depending upon the application in question, the base in a particular instance may be comprised of a film-forming material, e.g., plastic, cellulose acetate, cellulose acetate butyrate, polyester, polycarbonate and the like; alternatively, such bases may be fibrous in structure, e.g., high-grade allsulfite bond paper, cotton, cloth, starch filled cloth, etc. Alternatively, the base may be provided with a suitable protective pre-coating composition for purposes of promoting adhesion of the sensitized layer to the base material. Such embodiments are particularly preferred in those instances wherein difficulty is encountered in achieving the requisite degree of adhesion between the sensitized layer and base material; moreover, such procedures are uniquely advantageous since the pre-coating can serve as a diffusion barrier, thereby further insuring against any possibility of spurious migration of sensitizer or other ingredients of a hydrophilic nature. Suitable pre-coating compositions in this regard include, for example, aqueous dispersions of polyvinyl acetate, silica, etc. In any event, compositions for such purposes are well known in the art.

The following examples are given for purposes of illustration only and are not to be considered in any way as necessarily constituting a limitation on the scope of the present invention.

EXAMPLE 1

This example illustrates the adaptability of the improved light-sensitive diazonium compound to thermal processing.

A suitable base is coated with the following solution:

| | Grams |
|---|---|
| Citric acid | 0.5 |
| Sodium 6,7-dihydroxynaphthalene-2-sulfonate | 3.0 |
| Magnesium chloride | 0.5 |
| Sodium trichloroacetate | 3.0 |
| Sodium 1,3,6-naphthalene trisulfonate | 3.0 |
| Polyvinyl alcohol | 4.0 |
| Silica | 4.0 |
| Polyvinyl acetate emulsion | 5.0 |
| 4 - (4 - hydroxypiperidino)benzene - diazonium chlorozincate | 0.7 |
| Water to 100 grams. | |

The paper is dried and exposed to light through a translucent original. The exposed paper is developed by passing it through a heat chamber at 150°–175° C. to give an opaque image against a clean background.

The diazonium salt described in Example 1 is prepared as follows:

4-(4-hydroxypiperidino)benzenediazonium chlorozincate.—A mixture of 10 g. (0.045 mole of 4-hydroxy-1-(4-nitrophenylpiperidine, 150 ml. of ethanol and a small amount of palladium on charcoal is shaken under hydrogen to yield the corresponding amine. The mixture is filtered to remove catalyst, acidified with hydrochloric acid, and diazotized with butyl nitrite. The alcoholic solution of the diazonium salt is treated with an alcoholic zinc chloride solution to precipitate the double salt, M.P. 135–136 decomp.

*Analysis.*—Calcd. for $C_{22}H_{28}Cl_4N_6O_2Zn$: C, 42.91; H, 4.58; N, 13.65. Found: C, 42.69; H, 4.58; N, 13.70%.

4 - hydro - 1 - (4 - nitrophenyl)piperidine.—A mixture of 9.5 g. (0.1 mole) of 4 hydroxypiperidine, 14.1 g. of p-fluoronitrobenzene, and 25 ml. of triethylamine is refluxed for one hour, cooled, and poured into dilute acid. The product separated, is collected on funnel, and recrystallized from ethanol to give yellow crystals, M.P. 116–117°.

*Analysis.*—Calcd. for $C_{11}H_{14}N_2O_3$: C, 59.45; H, 6.35; N, 12.60. Found: C, 59.69; H, 6.47. N, 12.54%.

EXAMPLE 2

Example 1 is repeated, except that the light-sensitive diazonium compound employed comprises 4-(3-hydroxypiperidino)benzenediazonium chlorozincate. Exposure and processing is effected as described in Example 1. Again, an opaque print with clean background is obtained. The diazonium salt employed in Example 2 is prepared as follows:

4 - (3 - hydroxypiperidino)benzenediazonium chlorozincate.—A mixture of 10 g. of 3 hydroxy 1-(4-nitrophenyl)piperidine, 150 ml. of ethanol, and palladium catalyst is shaken under hydrogen to yield the corresponding amine which is diazotized in the usual maner. The compound is isolated as the double zinc chloride salt, M.P. 145–146° decomp.

*Analysis.*—Calcd. for $C_{22}H_{28}Cl_4N_6O_2Zn$: C, 42.91; H, 4.58; N, 13.65. Found: C, 42.58; H, 4.47; N, 13.56%.

3 - hydroxy - 1 - (4 - nitrophenyl)piperidine.—A mixture of 9.5 g. (0.1 mole) of 3-hydroxypiperidine, 14.1 g. p-fluoronitrobenzene and 25 ml. of triethylamine is heated to reflux for four hours, cooled, and the product isolated by dilution with water. The solid is recrystallized from ethanol to give a melting point of 123–125°.

*Analysis.*—Calcd for $C_{11}H_{14}N_2O_3$: C, 59.45; H, 6.35; N, 12.60. Found: C, 59.24; H, 6.57; N, 12.53%.

EXAMPLE 3

This example illustrates the adaptability of the light-sensitive diazonium compound of the present invention to semi-dry diazotype processing.

A sensitizing solution of the following composition is coated on a suitable base:

| | | |
|---|---|---|
| 2,5 - diethoxy - 4 - (4 - hydroxypiperidino)benzene-diazonium chlorozincate | grams | 2 |
| Citric acid | do | 5 |
| Thiourea | do | 5 |
| Zinc chloride | do | 5 |
| 6,7-dihydroxynaphthalene-2-sulfonic acid sodium salt | grams | 3 |
| Saponin | do | 01 |
| Ethylene glycol | cc | 5 |
| Alcohol | grams | 2 |
| Water to 100 grams. | | |

The coating is dried and exposed to light through a translucent original. A print is obtained after treatment with ammonia vapor. A blue image against a clean background is obtained. The diazonium salt given in the example may be prepared as follows:

2,5 - diethoxy - 4 - (4 - hydroxypiperidino)benzene diazonium chlorozincate.—A mixture of 11.2 g. (0.036 mole) of 1-(2,5 diethoxy-4-nitrophenyl)-4-hydroxypiperidine, 150 ml. of ethanol, and palladium on charcoal is shaken under hydrogen to reduce the nitro group. The resulting amine is diazotized with butyl nitrite and the diazo isolated by the addition of zinc chloride solution. The salt is purified by recrystallization from an ethanol-ether mixture to give crystals, M.P. 130–131 decomp.

*Analysis.*—Calcd. for $C_{30}H_{44}Cl_4N_6O_6Zn$: C, 45.50; H, 5.60; N, 10.61. Found: C, 45.28; H, 6.12; N, 10.68%.

1 - (2,5 - diethoxy - 4 - nitrophenyl) - 4 - hydroxypiperidine.—A mixture of 24.5 g. (0.1 mole) 2,5-diethoxy-4-chloronitrobenezene, 9.5 g. of 4-hydroxypiperidine and 100 ml. of triethylamine is heated to reflux for 24 hours. The mixture is diluted with water and the solid that formed is collected on a funnel. It is recrystallized from ethanol to give crystals, M.P. 103–105°.

*Analysis.*—Calcd. for $C_{15}H_{22}N_2O_5$: C, 58.05; H, 7.14; N, 9.03. Found: C, 58.46; H, 7.21; N, 8.82%.

Although the present invention has been particularly described with reference to light-sensitive diazo compounds wherein the 4-amino substituent comprises a hydroxy-substituted piperidino moiety, it will be understood that the invention is not limited thereto. Thus, for example, similar improvement can be obtained with the use of light-sensitive diazo compounds wherein the hydroxy-substituted piperidino moiety is replaced by hydroxy-substituted: piperazine, morpholine, thiomorpholine, pyrrolidine, etc. It will also be understood that more than one hydroxy group may be present as a substituent of the heterocyclic amino moiety. The advantage offered by a specific compound in a particular instance will depend primarily upon the requirements of the processor.

This invention has been described with respect to certain preferred embodiments and there will become obvious to persons skilled in the art other variations, modifications, and equivalents which are to be understood as coming within the scope of the present invention.

What is claimed is:

1. A diazo sensitizing composition comprising an aqueous solution of light-sensitive diazonium compound formed by diazotizing the primary amine of a paraphenylenediamine of the following structural formula:

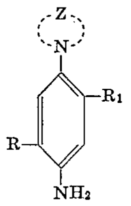

wherein R and $R_1$ independently are selected from the group consisting of hydrogen, halogen, alkyl and alkoxy, and Z represents the atoms necessary to complete a hydroxy-substituted piperidino ring.

2. A composition according to claim 1, wherein said light-sensitive diazonium compound comprises 4-(4-hydroxypiperidino)benzenediazonium chlorozincate.

3. A composition according to claim 1, wherein said light-sensitive diazonium compound comprises 4-(3-hydroxypiperidino)benzenediazonium chlorozincate.

4. A composition according to claim 1, wherein said light-sensitive diazonium compound comprises 2,5-diethoxy - 4 - (4 - hydroxypiperidino)benzenediazonium chlorozincate.

5. A diazo sensitizing composition according to claim 1, further containing at least one coupling component.

6. A composition according to claim 5, wherein said coupling component comprises sodium-6,7-dihydroxynaphthalene-2-sulfonate.

7. A composition according to claim 5, further containing a heat-responsive reagent comprising a neutral to acid salt of a strong organic acid capable of yielding an alkaline-reacting compound upon heating to a temperature within the range of from about 100° C. to about 200° C.

8. A composition according to claim 7, wherein said heat-responsive reagent comprises sodium trichloroacetate.

9. A diazonium compound formed by diazotizing the primary amine of a paraphenylenediamine of the following structural formula:

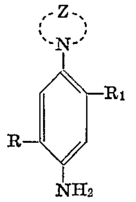

wherein R and $R_1$ independently are selected from the group consisting of hydrogen, halogen, alkyl and alkoxy, and Z represents the atoms necessary to complete a hydroxy-substituted piperidino ring.

10. A diazotype method of photoreproduction which comprises exposing a diazotype material imagewise to actinic radiation, said diazotype material comprising a support having a light-sensitive diazonum compound defined in claim 1, and developing said material in an alkaline medium to form a visible azo-dye image in the unexposed areas.

References Cited

UNITED STATES PATENTS

| | | | |
|---|---|---|---|
| 2,298,444 | 10/1942 | Weissberger et al. | 96—91 |
| 3,028,240 | 4/1962 | Werner et al. | 96—91 |
| 3,186,845 | 6/1965 | Sus et al. | 96—91 |
| 3,203,803 | 8/1965 | Habib et al. | 96—91 |
| 3,379,531 | 4/1968 | Mizianty et al. | 96—91 |
| 3,424,585 | 1/1969 | Binzer | 96—91 |

FOREIGN PATENTS

| | | |
|---|---|---|
| 629,326 | 10/1963 | Belgium. |
| 6,400,473 | 7/1964 | Netherlands. |
| 6,505,812 | 8/1965 | Netherlands. |

OTHER REFERENCES

Van der Grinten Bulletin, vol. 20, December 1962, pp. 1–7.

NORMAN G. TORCHIN, Primary Examiner

C. BOWERS, Assistant Examiner

U.S. Cl. X.R.

96—75, 91; 260—141